United States Patent [19]

Michaud

[11] 4,197,563
[45] Apr. 8, 1980

[54] METHOD AND DEVICE FOR ORIENTATING AND FIXING IN A DETERMINED DIRECTION MAGNETIC PARTICLES CONTAINED IN A POLYMERIZABLE INK

[75] Inventor: André Michaud, Chatenay Malabry, France

[73] Assignee: Transac - Compagnie pour le Developpement des Transactions Automatiques, Paris, France

[21] Appl. No.: 954,027

[22] Filed: Oct. 23, 1978

[30] Foreign Application Priority Data

Nov. 10, 1977 [FR] France .............................. 77 33891

[51] Int. Cl.² .............................................. G11B 5/02
[52] U.S. Cl. ............................................... 360/56
[58] Field of Search ............... 346/74.1; 235/61.11 D; 360/56, 55

[56] References Cited

U.S. PATENT DOCUMENTS

| | | | |
|---|---|---|---|
| 3,879,754 | 4/1975 | Ballinger | 360/56 |
| 3,982,334 | 9/1976 | Tate | 360/56 |
| 3,998,160 | 12/1976 | Pearce | 360/56 |
| 4,013,462 | 3/1977 | Goffe | 360/56 |

FOREIGN PATENT DOCUMENTS 2124033  9/1971  Fed. Rep. of Germany ............. 360/56

*Primary Examiner*—John H. Wolff
*Attorney, Agent, or Firm*—Sughrue, Rothwell, Mion, Zinn and Macpeak

[57] ABSTRACT

The invention comes within the field of magnetic recording. A method of orientating and fixing in a determined direction magnetic particles contained in a polymerizable ink (2) spread on a support (1), characterized by the following operations; the support is conveyed towards a zone (5) subjected to a magnetic field whose orientation and direction are adjusted as a function of time in accordance with the message to be written, the support passing through the zone at an adjustable speed, and while the support is passing therethrough, the ink deposited on it is polymerized by means of ultraviolet radiation from a lamp (10) which reaches only a part of the zone submitted to the magnetic field, said part corresponding to that through which said inked support last passes.

The invention applies in particular to identity documents.

3 Claims, 2 Drawing Figures

METHOD AND DEVICE FOR ORIENTATING AND FIXING IN A DETERMINED DIRECTION MAGNETIC PARTICLES CONTAINED IN A POLYMERIZABLE INK

BACKGROUND OF THE INVENTION

In U.S. patent application Ser. No. 846,088 the applicant describes a method of permanent magnetic recording in which, after coating a support with a polymerizable magnetic ink, the magnetic particles contained in the still fluid ink are orientated in a first direction by means of magnetic field, then some zones of the magnetic ink are polymerized selectively by ultraviolet irradiation; this fixes the position of the magnetic particles contained in these zones; then the particles contained in the unpolymerized zones are orientated in a different direction; lastly, the parts which are not yet polymerized are then polymerized.

In the above method, there are five successive operating stations; this is fairly cumbersome; further, the selective polymerization device is complicated; lastly, the method allows only two possible orientations of the magnetic particles, or at least it is necessary to have as many magnets and drying devices as there are different orientations of the particles on a support.

SUMMARY OF THE INVENTION

The present invention aims to mitigate these disadvantages and provides a method of orientating and fixing in a determined direction magnetic particles contained in a polymerizable ink spread on a support, the method comprising following operations: the support is conveyed towards a zone subjected to a magnetic field whose orientation and direction are adjusted as a function of time in accordance with the message to be written, the support passing through the zone at an adjustable speed, and while the support is passing therethrough, the ink deposited on it is polymerized by means of ultraviolet radiation on which reaches only a part of the zone submitted to the magnetic field, said part corresponding to that through which said inked support passes the last.

The invention also provides a device for using the method according to the invention, the device comprising two magnetic circuits which each have a winding fed with a current at a controlled variable intensity, each magnetic circuit including an air gap, the air gaps of both circuits being situated in the same plane and orientated substantially at right angles to each other, an ultraviolet radiation lamp being disposed above the zone formed by said air gaps and a screen which is opaque to ultraviolet radiation being disposed between said zone and said lamp masking a part of said zone. The inked support moves below the screen from the part of the zone masked by the screen towards the zone subjected to ultraviolet radiation.

The invention also provides a magnetic recording medium which comprises a magnetic track comprising fixed magnetic particles whose orientation varies from one zone to another, produced according to the method in the invention.

An embodiment of the invention will now be described with reference to the accompanying drawings.

DESCRIPTION OF THE PREFERRED EMBODIMENT

Figure 1:
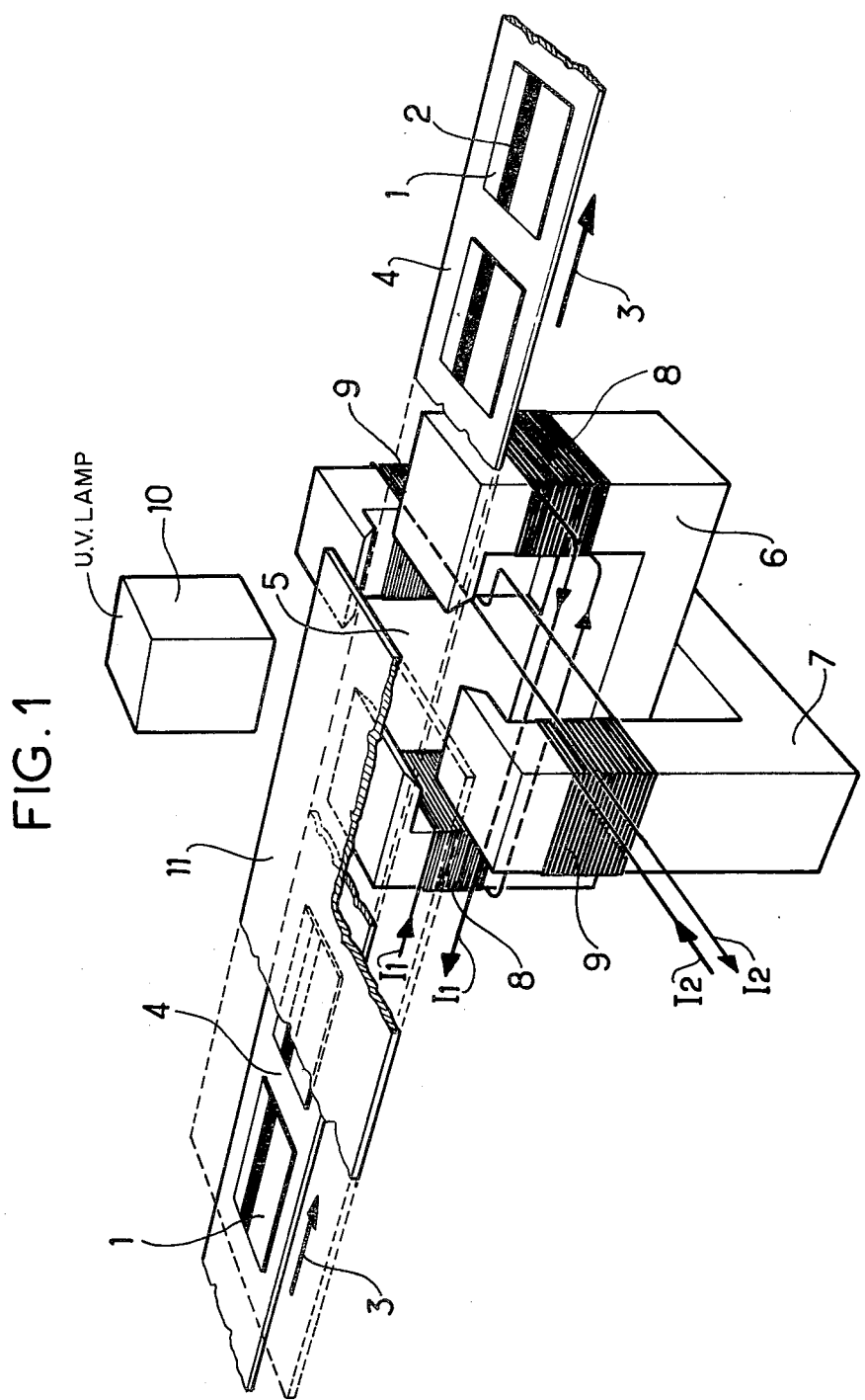
FIG. 1 is a perspective view which shows the device for using the method in accordance with the invention.

FIG. 1 shows tickets 1 which bear a magnetic track 2. The magnetic track is formed by a deposit of fluid magnetic ink which contains magnetic particles. The ink is polymerizable by ultraviolet irradiation. The ink used can be, for example, an ink manufactured by Messrs, Brancher and referenced U604, and its polymerization is triggered by ultraviolet radiation after a delay of about a tenth of a second. These tickets are conveyed from left to right in the direction of the arrows 3 by a conveyor belt 4. They pass above a zone 5 in which a magnetic field is set up whose orientation and direction can be varied as required. The device for setting up the magnetic field comprises two magnetic circuits 6 and 7. The magnetic circuit 6 has a winding 8 in two parts, fed by a current $I_1$, and an air gap parallel to the direction of movement of the tickets 1. The magnetic circuit 7 comprises a winding 9 in two parts, fed by a current $I_2$, and an air gap situated at the same level as the previous one but perpendicular to the direction of movement of the tickets 1.

The zone 5, which is the air gap common to both magnetic circuits 6 and 7, is therefore subjected to a magnetic field which results from the currents applied $I_1$ and $I_2$. Depending on the values of these currents, the magnetic field in the zone 5 can assume any orientation required.

An ultraviolet radiation lamp 10 is placed above the magnetic circuits and covers the whole of the air gap zone 5.

Lastly, a screen 11 covers half the air gap zone 5. The screen is placed above the tickets 1 and below the lamp 10.

When the tickets 1 move from left to right, they are subjected to the magnetic field produced by the magnetic circuits 6 and 7 while occupying a part of the zone 5 which is protected by the screen 11, then as soon as they leave the screen, the still fluid ink which contains the magnetic particles is very quickly polymerized due to the ultraviolet radiation produced by the lamp 10. This polmerization fixes the particles in the position conferred by the magnetic field in the zone 5.

Therefore, by varying the currents $I_1$ and $I_2$, the magnetic particles of a ticket can be fixed at will in different orientations from one zone to another, and these zones can be made as long as required.

Two advantageous privileged orientations are generally used—one parallel to the arrow 3 and corresponding to the currents $I_1 > 0$ and $I_2 = 0$ and the other perpendicular to the arrow 3 and corresponding to the currents $I_1 = 0$ and $I_2 > 0$, but any other orientation can be obtained by combining different values of $I_1$ and $I_2$.

Figure 2:
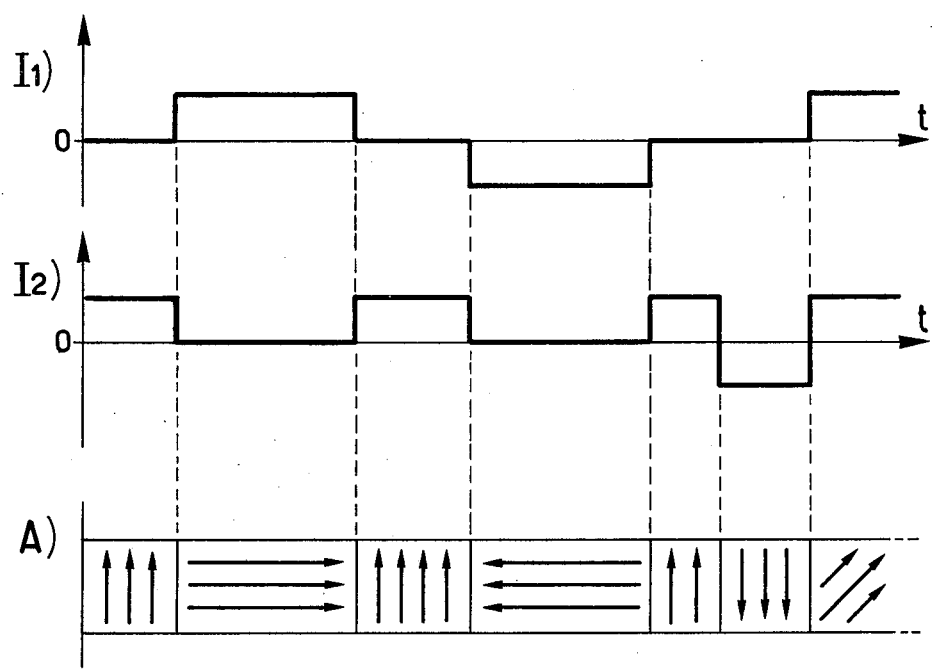
FIG. 2 is a diagram which represents the magnetic orientation of the support in its various zones depending on the current applied to the windings of the magnetic circuits.

FIG. 2 is a waveform diagram of the various magnetic orientations in different zones of the same ticket, depending on the applied currents $I_1$ and $I_2$.

The top part of the diagram shows the values $I_1$ as a function of time; the middle part shows the values of $I_2$ as a function of time; and the bottom part shows at A the resulting orientation of the magnetic particles subjected to the magnetic field which results from the currents $I_1$ and $I_2$.

The method is therefore very simple and requires only a small amount of equiplent and there is only one operating station. This single station is capable of orienting the magnetic particles contained in successive zones of the ink in any desired orientation.

I claim:

1. A method of orienting and fixing magnetic particles in a determined direction, the magnetic particles being contined in a polymerizable ink spread on a support, the method comprising the following steps:
   conveying the support towards a single zone, subjecting said single zone to a magnetic field whose orientation, direction and size are variably adjusted as a function of time in accordance with the message to be written,
   passing the support through the zone at an adjustable speed, and
   while the support is passing therethrough, polymerizing the ink deposited on it by means of ultraviolet radiation which reaches only a part of the zone submitted to the magnetic field, said part corresponding to that through which said inked support last passes.

2. A device for orienting and fixing magnetic particles in a determined direction, the magnetic particles being contained in a polymerizable ink spread on a support, said device operating in accordance with a method comprising the following steps;
   conveying the support towards a single zone subjected to a magnetic field whose orientation, direction and size are variably adjusted as a function of time in accordance with the message to be written,
   passing the support through the single zone at an adjustable speed, and
   while the support is passing therethrough, polymerizing the ink deposited on it by means of ultraviolet radiation which reaches only a part of the single zone submitted to the magnetic field, said part corresponding to that through which said inked support last passes,
said device comprising:
   two magnetic circuits, each having a winding fed with a current at a controlled variable intensity, each magnetic circuit including an air gap, the air gaps of both circuits being situated in the same plane and oriented substantially at right angles to each other,
   an ultraviolet radiation lamp disposed above the zone formed by said air gaps,
   a screen being opaque to ultraviolet radiation being disposed between said zone and said lamp and masking a part of said zone, and
   means for moving the inked support below the screen from the part of the zone masked by the screen towards the zone subjected to ultraviolet radiation.

3. A method of orienting and fixing magnetic particles in a determined direction, the magnetic particles being contained in a polymerizable ink spread on a support, said method comprising the following steps:
   conveying the support towards a single zone subjected to a magnetic field whose orientation, direction and size are variably adjusted as a function of time in accordance with the message to be written,
   passing the support through the single zone, and
   while the support is passing therethrough, polymerizing the ink deposited on it by means of ultraviolet radiation which reaches only a part of the zone submitted to the magnetic field, said part corresponding to that through which said inked support last passes.

* * * * *